United States Patent
Koopmann

(10) Patent No.: US 11,632,227 B2
(45) Date of Patent: Apr. 18, 2023

(54) SIGNAL INTERPOLATION METHOD AND MEASUREMENT INSTRUMENT

(71) Applicant: Rohde & Schwarz GmbH & Co. KG, Munich (DE)

(72) Inventor: Bendix Koopmann, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 17/543,241

(22) Filed: Dec. 6, 2021

(65) Prior Publication Data

US 2022/0224502 A1   Jul. 14, 2022

(30) Foreign Application Priority Data

Jan. 13, 2021   (EP) ..................................... 21151449

(51) Int. Cl.
   *H04B 3/46*      (2015.01)
   *H04B 17/00*     (2015.01)
   *H04Q 1/20*      (2006.01)
   *H04L 7/00*      (2006.01)

(52) U.S. Cl.
   CPC ................................ *H04L 7/0029* (2013.01)

(58) Field of Classification Search
   CPC .......................... H04L 7/0029; G11B 20/1816
   USPC ................................ 375/226, 227, 224, 371
   See application file for complete search history.

(56) References Cited

U.S. PATENT DOCUMENTS

| 7,388,937 | B1  | 6/2008 | Rodger et al. |
| 7,945,009 | B1* | 5/2011 | Liu ..................... G11B 20/1816 |
|           |     |        | 360/39 |
| 8,478,576 | B1  | 7/2013 | Cameron |
| 2014/0286381 | A1 | 9/2014 | Shibasaki |

FOREIGN PATENT DOCUMENTS

| EP | 1267172 A2 | 12/2002 |
| EP | 2985617 A2 | 2/2016 |

* cited by examiner

*Primary Examiner* — Phuong Phu
(74) *Attorney, Agent, or Firm* — Christensen O'Connor Johnson Kindness PLLC

(57) ABSTRACT

A signal interpolation method is described. The method includes: receiving an analog input signal; digitizing the analog input signal received, thereby obtaining a digitized input signal having samples; determining a crossing of the digitized input signal with respect to a threshold that was set; and interpolating a signal between at least two successive samples, wherein the signal interpolated has two signal portions each having a linear slope, and wherein one of the signal portions crosses the threshold. A measurement instrument is also described.

13 Claims, 2 Drawing Sheets

SIGNAL INTERPOLATION METHOD AND MEASUREMENT INSTRUMENT

TECHNICAL FIELD

Embodiments of the present disclosure generally relate to signal interpolation methods. Further, embodiments of the present disclosure generally relate to measurement instruments.

BACKGROUND

It is known in signal processing that jitter occurring in the time domain or rather in the frequency domain has an influence on the ideal timing of an event in a signal. Accordingly, jitter results in a mispositioning of significant edges in a sequence of data bits from their ideal positions. In modern serial data communications systems, the respective serial data clock is not usually transmitted with the data such that jitter may cause data errors at the receiving end.

It is therefore important to determine the amount and kind of jitter that may be present in a signal to be analyzed. In this regard, it is noted that jitter in general, also called Total Jitter (TJ), comprises two distinct types, namely Deterministic Jitter (DJ) and Random Jitter (RJ).

Random Jitter (RJ) is unbounded in amplitude and assumed to be Gaussian. In contrast, Deterministic Jitter (DJ) is not random and is bounded in amplitude. Deterministic Jitter (DJ) comprises Inter-Symbol Interference (ISI), Duty Cycle Distortion (DCD), and Periodic Jitter (PJ), wherein Inter-Symbol Interference (ISI) and Duty Cycle Distortion (DCD) relate to Data Dependent Jitter (DDJ). Accordingly, Deterministic Jitter (DJ) comprises Periodic Jitter (PJ) and Data Dependent Jitter (DDJ).

ISI is caused by the time differences required for a signal to arrive at a threshold when starting from different places in bit sequences, i.e. symbols. DCD is the difference in the mean pulse width of a logic "1" pulse compared to the mean pulse width of a logic "0" pulse in a clock-like bit sequence.

PJ is characterized by periodic variations in edge transition times at frequencies that are uncorrelated with the data rate. The mean signed difference between the measured time location of each sequential data symbol transition and the nominal symbol transition time is called Time Interval Error (TIE).

As mentioned above, the data clock is not usually transmitted with the data. Therefore, it is inter alia known in the state of the art to use different techniques to arrive at the respective timings of the events.

For instance, a Clock Data Recovery (CDR) is used in order to identify the respective timing of the events in the signal to be analyzed, as Duty Cycle Distortion would be noticeable after a Clock Data Recovery and a measurement in the histogram, or statistical analysis of the edges per bit sequence.

Further, it is also known to derive the respective timings of the events based on a spectrum analysis of the signal to be analyzed, wherein deterministic jitter and random jitter are separated from each other by using their spectral properties. In fact, it is known that deterministic jitter exhibits a spectrum of impulses, whereas random jitter exhibits a broad, flat spectrum. These different spectral properties are used for obtaining the respective jitter components such that the timings of the events can be determined/estimated accordingly.

However, the known techniques for determining/estimating the timings of the events are complex.

Accordingly, there is a need for a simple and cost-efficient way to determine or rather estimate the timings of events in a signal to be analyzed.

SUMMARY

The present disclosure relates to signal interpolation methods. In an embodiment, the signal interpolation method comprises the steps of:
  receiving an analog input signal;
  digitizing the analog input signal received, thereby obtaining a digitized input signal having samples;
  determining a crossing of the digitized input signal with respect to a threshold that was set; and
  interpolating a signal between at least two successive samples, wherein the signal interpolated has two signal portions each having a linear slope, and wherein one of the signal portions crosses the threshold.

The main idea is based on the finding that a waveform of the digitized input signal is generated, namely the interpolated signal, which can be further processed in order to identify and separate different jitter components, for instance by performing a Fourier transformation of the interpolated signal derived from the digitized signal. The interpolated signal is obtained in a certain way, thereby simplifying the subsequent separation of the different jitter components such that the timings of the events can be determined/estimated in an improved manner.

In some embodiments, the analog input signal is processed such that a crossing of the digitized input signal with respect to the threshold is identified. The threshold was set. Hence, the threshold corresponds to a predetermined threshold. In some embodiments, the crossing can be identified by recognizing that two successive samples of the digitized signal are associated below and above the threshold. In the area about the crossing of the threshold, the respective waveform is interpolated, namely the interpolated signal that has the two signal portions each having a linear scope. The signal portions are combined with each other, thereby creating a respective crosspoint of the interpolated signal with respect to the threshold.

An aspect provides that the linear slopes of the two signal portions are variable, thereby construing a variable crosspoint at which the signal interpolated crosses the threshold. Thus, a floating crosspoint is provided that can be set appropriately. In other words, the two signal portions being variable can be combined such that an arbitrary crosspoint of the interpolated signal can be obtained, namely the interpolated waveform.

Accordingly, different edge timings may be derived appropriately, e.g., early edges or rather late edges.

Another aspect provides that the two signal portions are linearly combined, thereby obtaining the signal interpolated. Hence, the signal portions merge into each other, which might result in a kink of the interpolated signal. In general, a linear interpolation of the signal/waveform derived from the digitized input signal is done.

For instance, the first signal portion crosses the threshold. Generally, this relates to an early edge, as the first signal portion is associated with the first of the at least two successive samples, resulting in a crossing closer to the first of the two successive samples.

In some embodiments, a crosspoint associated with the first signal portion follows the equation $$c_1 = \frac{T-S}{m*a_1},$$

wherein T relates to the level of the threshold, S relates to the level of the first sample, m relates to the steepness, $a_1$ relates to the fraction of the first signal portion between the levels of the samples, and $c_1$ is the location of the crosspoint with respect to the first sample, wherein $a_1$ amounts between 0.5 and 1. Accordingly, the crosspoint in the first signal portion, namely the crosspoint associated with the early edge, can be calculated according to a model applied, which comprises information concerning the levels of the first sample and the threshold as well as the steepness in general, namely the level difference between two successive samples in the respective symbol transition area.

Alternatively, the second signal portion crosses the threshold. Generally, this relates to a late edge, as the second signal portion is associated with the second of the at least two successive samples, resulting in a crossing closer to the second of the two successive samples.

In some embodiments, a crosspoint associated with the second signal portion follows the equation $$c_2 = \frac{E-T}{m*a_2},$$

wherein E relates to the level of the second sample, T relates to the level of the threshold, m relates to the steepness, $a_2$ relates to the fraction of the second signal portion between the levels of the samples, and $c_2$ is the location of the crosspoint with respect to a center between both samples, wherein $a_2$ amounts between 0.5 and 1. Accordingly, the crosspoint in the second signal portion, namely the crosspoint associated with the late edge, can be calculated according to a model applied, which comprises information concerning the levels of the second sample and the threshold as well as the steepness in general, namely the level difference between two successive samples in the respective symbol transition area.

Another aspect provides that the slopes of the two signal portions depend on each other. Accordingly, the slope of the first signal portion influences the slope of the second signal portion and vice versa.

In some embodiments, the slopes depend on each other in that the steeper the slope of the first signal portion, the flatter the slope of the second signal portion or vice versa. Generally, both slopes together have to ensure that a symbol transition between the two successive samples take place.

Accordingly, the slope of the first signal portion may range between 0 and a steepness, wherein the slope of the second signal portion is the steepness minus the slope of the first signal portion. Therefore, both slopes depend on each other, wherein both slopes together ensure that the respective signal portions together are associated with the respective steepness at the symbol transition area that encompasses the crossing of the threshold by the digitized signal.

A further aspect provides that the linear slopes of the signal portions are different from each other. Accordingly, the crosspoint is located in the first signal portion or rather the second signal portion.

In case that the crosspoint is located in the center between both successive samples, the linear slopes of the signal portions are equal, thereby ensuring that the first signal portion and the second signal portion both cross the threshold, namely via the end and the beginning respectively.

Another aspect provides that the interpolated signal comprises a synthesized time interval error (TIE) signal. The time interval error signal corresponds to the mean signed difference between the measured time locations of each symbol transition and the nominal symbol transition times.

Further, the present disclosure relates to measurement instruments. In an embodiment, the measurement instrument comprises a reception interface, at least one input channel, a sampling circuit and an analysis circuit. The reception interface is configured to receive an analog input signal. The sampling circuit is configured to digitize the analog input signal received and to output a digitized input signal having samples. The analysis circuit is configured to determine crossing of the digitized input signal with respect to a threshold that was set, namely a predetermined threshold. The analysis circuit is also configured to interpolate a signal between at least two successive samples, wherein the signal interpolated has two signal portions each having a linear slope, and wherein one of the signal portions crosses the threshold. Accordingly, the measurement instrument can be used to perform any one of the signal interpolation methods described above, as the analysis circuit is configured to perform, for example, the respective interpolating step.

The characteristics and advantages mentioned above also apply to the measurement instrument in a similar manner.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
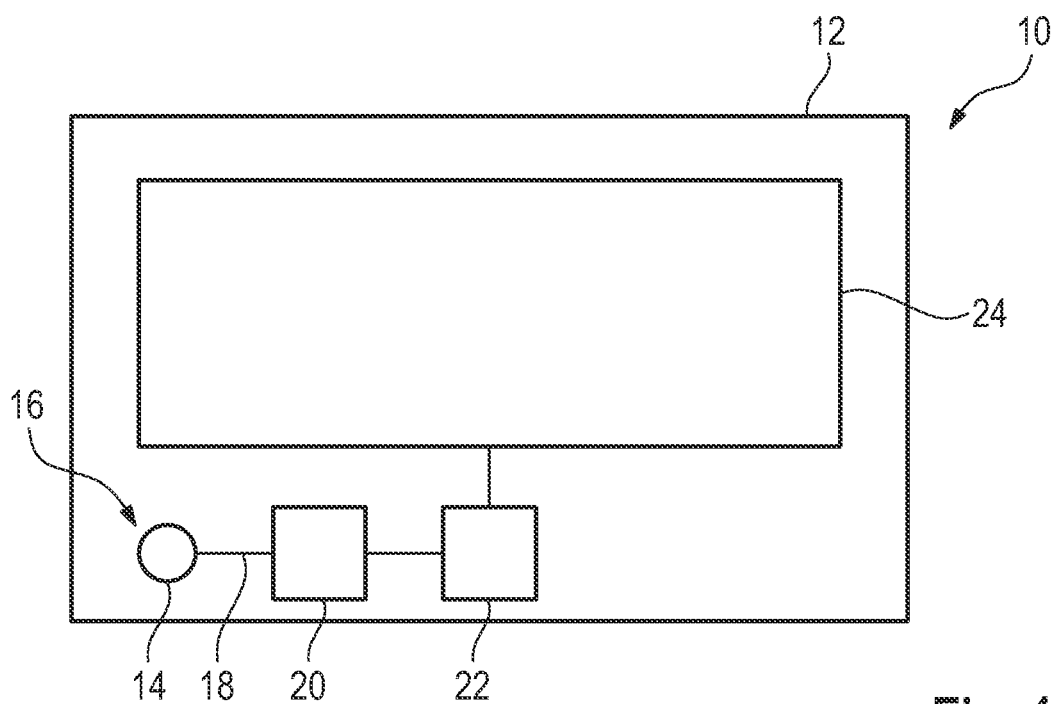
FIG. 1 schematically shows a measurement instrument according to an embodiment of the present disclosure.

In FIG. 1, a measurement instrument 10 is shown that has a housing 12 that encompasses several circuits used for processing a signal received. For receiving the respective signal to be processed, the measurement instrument 10 has a reception interface 14 that is located at a front end 16 of the measurement instrument 10.

The reception interface 14 is connected with at least one input channel 18 that connects the reception interface 14 with a sampling circuit 20. The sampling circuit 20 digitizes the analog input signal that has been received via the reception interface 14 in order to obtain a digitized input signal that has several samples.

The sampling circuit 20 is connected with an analysis circuit 22 that receives the digitized input signal outputted by the sampling circuit 20. The analysis circuit 22 is configured to determine a crossing of the digitized input signal with respect to a threshold that was set, for example a threshold level. Thus, the threshold that was set corresponds to a predetermined threshold.

The analysis circuit 22 is also configured to interpolate a signal, namely a waveform, between at least two successive samples associated with a symbol transition area, namely two successive samples located prior and after the crossing determined previously. Accordingly, the at least two successive samples have different levels, for example lower and higher than the threshold level respectively.

The analysis circuit 22 is further configured to generate an arbitrary interpolated signal that has two signal portions that merge into each other. The respective signal portions each have a linear slope, wherein at least one of the signal portions crosses the threshold that was set, namely the predetermined threshold.

In the embodiment shown in FIGURE, the measurement instrument 10 further comprises a display 24. The display 24 is connected with the analysis circuit 22 for graphically illustrating information provided by the analysis circuit 22.

Figure 2:
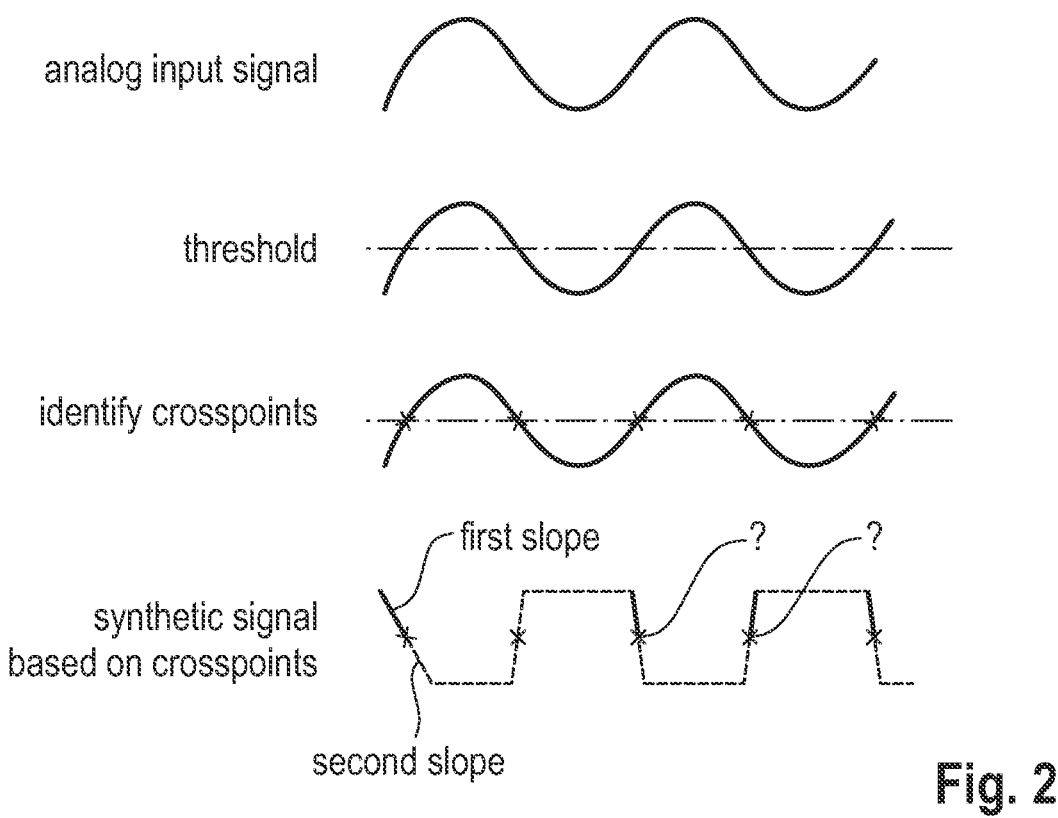
FIG. 2 schematically shows steps of a signal interpolation method according to an embodiment of the present disclosure.

In general, the respective method steps performed by the measurement instrument 10 are shown, for example, in FIG. 2, as the analog input signal is received and digitized, thereby obtaining the digitized input signal that is compared with a threshold in order to identify crosspoints of the digitized input signal with respect to the threshold.

Afterwards, the analysis circuit 22 generates or interpolates the interpolated signal between two successive samples located prior and after an identified crossing/crosspoint of the digitized input signal with respect to the threshold. The respective signal interpolated, namely the waveform derived, has two signal portions each having a linear slope.

The respective signal portions may each have a variable linear slope, thereby construing a variable crosspoint at which the signal interpolated crosses the threshold.

Figure 3:
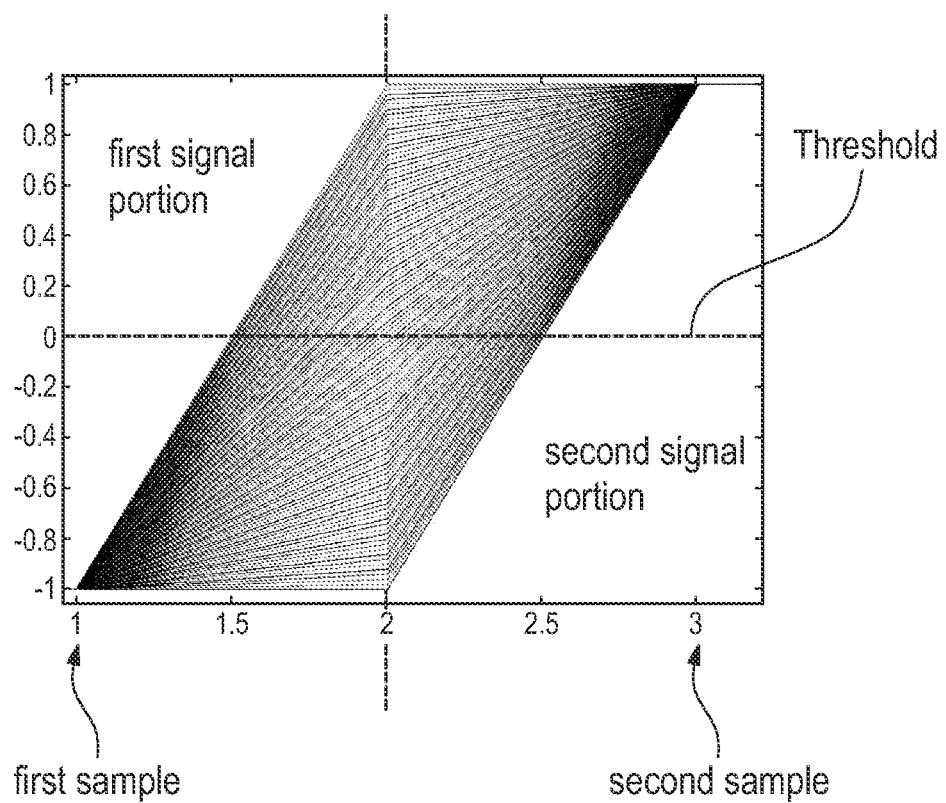
FIG. 3 schematically shows an example of an overview illustrating the variable slopes of the signal portions, yielding a variable crosspoint.

This concept is shown in more detail in FIG. 3 for different slopes of the two signal portions that together form the signal interpolated.

Generally, the signal interpolated can be generated such that the first signal portion or rather the second signal portion crosses the respective threshold, resulting in an early edge or rather a late edge. The early edge is located closer to the first of the two successive symbols located around the symbol transition area, whereas the late edge is located closer to the second of the two successive samples.

As shown in FIG. 3, the respective slopes of the two signal portions depend on each other, as the steeper the slope of the first signal portion, the flatter the slope of the second signal portion. Consequently, the flatter the slope of the first signal portion, the steeper the slope of the second signal portion.

In some embodiments, the slope of the first signal portion ranges between 0 and the steepness that is defined by the levels of the samples, e.g., level "−1" and level "1", namely 1−(−1)=2, and the shortest distance, e.g. a sample index step, namely 2−1=1, resulting in a steepness of 2/1=2. Then, the slope of the second signal portion corresponds to the steepness minus the slope of the first signal portion, thereby ensuring that both slopes together correspond to the steepness.

In some embodiments, the crosspoint associated with the first signal portion follows the equation $$c_1 = \frac{T-S}{m*a_1},$$

wherein T relates to the level of the threshold, S relates to the level of the first sample, m relates to the steepness, $a_1$ relates to the fraction of the first signal portion between the levels of the samples, and $c_1$ is the location of the crosspoint with respect to the first sample, wherein $a_1$ amounts between 0.5 and 1.

In the embodiment shown in FIG. 3, the parameters are as follows: T=0, S=−1, m=2 (as already described above). Then, the fraction of the first signal portion between the levels of the samples can be altered between 0.5 and 1, resulting in a variable crosspoint $c_1$, which may be between 0.5 and 1 with respect to the first sample having the sample index 1 such that the crosspoint $c_1$ has a sample index between 1.5 and 2.

Hence, the formula provided above can be rewritten as follows for the respective example provided:

$$-1+c_1*2*a_1=0,$$

as level of the first sample amounts to "−1", the steepness amounts to "2" and the level of the threshold amounts to "0".

Accordingly, the dependency of the fraction of the first signal portion between the levels of the samples and the variable crosspoint $c_1$ can be expressed as follows for the example given:

$$a_1 = \frac{1}{2*c_1}.$$

Further, the crosspoint associated with the second signal portion follows the equation $$c_2 = \frac{E-T}{m*a_2},$$

wherein E relates to the level of the second sample, T relates to the level of the threshold, m relates to the steepness, $a_2$ relates to the fraction of the second signal portion between the levels of the samples, and $c_2$ is the location of the crosspoint with respect to a center between both samples, wherein $a_2$ amounts between 0.5 and 1.

In the embodiment shown in FIG. 3, the parameters are as follows: E=1, T=0, m=2 (as already described above). Then, the fraction of the second signal portion between the levels of the samples can be altered between 0.5 and 1, resulting in a variable crosspoint $c_2$, which may be between 0 and 0.5 with respect to a center of both samples having the sample index 2 such that the crosspoint $c_2$ has a sample index between 2 and 2.5.

Figure 4:
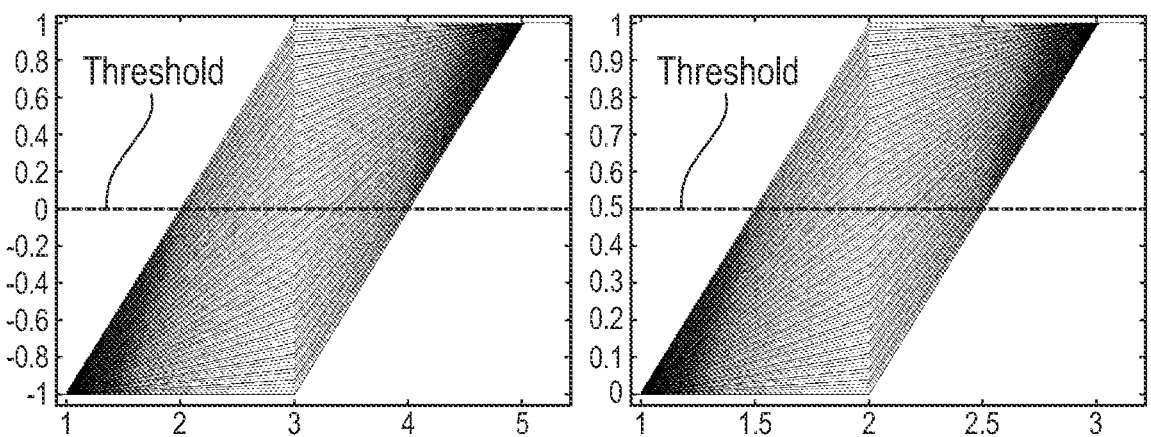
FIG. 4 schematically shows further examples of overviews illustrating the variable slopes of the signal portions, yielding a variable crosspoint for different models.

However, it is also possible that the steepness amounts to 1 and/or that the levels of the symbols are different, e.g., "level 0" and "level 1" such that the threshold level amounts to "level 0.5", as schematically indicated in the overviews shown in FIG. 4.

Generally, a floating point accuracy of the respective crosspoint can be ensured due to the linear combining of two possible slopes of the signal portions, which in turn results in an interpolated signal/waveform that can be used for estimating the different jitter components in a simple and cost-efficient manner.

For instance, the interpolated signal comprises a synthesized time interval error (TIE) signal.

Certain embodiments disclosed herein utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of hardware circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors, such as, for example, microprocessors, or portions thereof and accompanying software, firmware, hardware, and the like.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A signal interpolation method, the method comprising:
receiving an analog input signal;
digitizing the analog input signal received, thereby obtaining a digitized input signal having samples;
determining a crossing of the digitized input signal with respect to a threshold that was set; and
interpolating a signal between at least two successive samples, wherein the signal interpolated has two signal portions each having a linear slope, and wherein one of the signal portions crosses the threshold,
wherein the linear slopes of the two signal portions are variable, thereby construing a variable crosspoint at which the signal interpolated crosses the threshold.

2. The signal interpolation method according to claim 1, wherein the two signal portions are linearly combined, thereby obtaining the signal interpolated.

3. The signal interpolation method according to claim 1, wherein a first signal portion crosses the threshold.

4. The signal interpolation method according to claim 3, wherein a crosspoint associated with the first signal portion follows the equation $$c_1 = \frac{T - S}{m * a_1},$$

wherein T relates to the level of the threshold, S relates to the level of the first sample, m relates to the steepness, relates to the fraction of the first signal portion between the levels of the samples, and $c_1$ is the location of the crosspoint with respect to the first sample, wherein $a_1$ amounts between 0.5 and 1.

5. The signal interpolation method according to claim 1, wherein a second signal portion crosses the threshold.

6. The signal interpolation method according to claim 5, wherein a crosspoint associated with the second signal portion follows the equation $$c_2 = \frac{E - T}{m * a_2},$$

wherein E relates to the level of the second sample, T relates to the level of the threshold, m relates to the steepness, relates to the fraction of the second signal portion between the levels of the samples, and $c_2$ is the location of the crosspoint with respect to a center between both samples, wherein $a_2$ amounts between 0.5 and 1.

7. The signal interpolation method according to claim 1, wherein the slopes of the two signal portions depend on each other.

8. The signal interpolation method according to claim 1, wherein the slopes depend on each other in that the steeper the slope of the first signal portion, the flatter the slope of the second signal portion or vice versa.

9. The signal interpolation method according to claim 1, wherein the slope of the first signal portion ranges between 0 and a steepness, and wherein the slope of the second signal portion is the steepness minus the slope of the first signal portion.

10. The signal interpolation method according to claim 1, wherein the linear slopes of the signal portions are different from each other.

11. A measurement instrument, comprising:
   a reception interface configured to receive an analog input signal;
   at least one input channel;
   a sampling circuit configured to digitize the analog input signal received by the reception interface and to output a digitized input signal having samples; and
   an analysis circuit configured to:
      determine crossing of the digitized input signal with respect to a threshold that was set; and
      interpolate a signal between at least two successive samples,
   wherein the signal interpolated has two signal portions each having a linear slope, and wherein one of the signal portions crosses the threshold, wherein the linear slopes of the signal portions are different from each other or wherein the slopes depend on each other in that the steeper the slope of the first signal portion, the flatter the slope of the second signal portion or vice versa.

12. A measurement instrument having one or more circuits configured to perform the signal interpolation method according to claim 1.

13. A signal interpolation method, the method comprising:
   receiving an analog input signal;
   digitizing the analog input signal received, thereby obtaining a digitized input signal having samples;
   determining a crossing of the digitized input signal with respect to a threshold that was set; and
   interpolating a signal between at least two successive samples, wherein the signal interpolated has two signal portions each having a linear slope, and wherein one of the signal portions crosses the threshold,
   wherein the linear slopes of the signal portions are different from each other or wherein the slopes depend on each other in that the steeper the slope of the first signal portion, the flatter the slope of the second signal portion or vice versa.

* * * * *